Nov. 14, 1939.   W. B. KOCHNER   2,179,745
FOOD MIXER HANDLE CONSTRUCTION
Filed Dec. 14, 1937
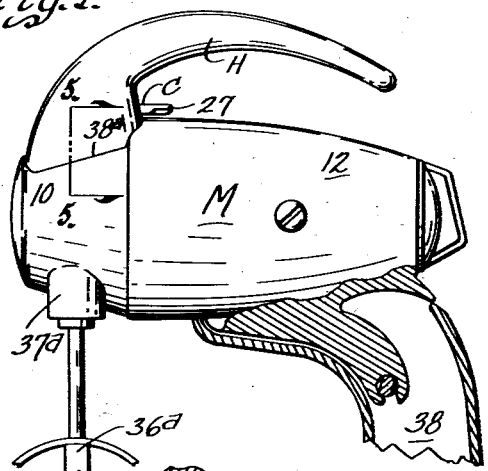
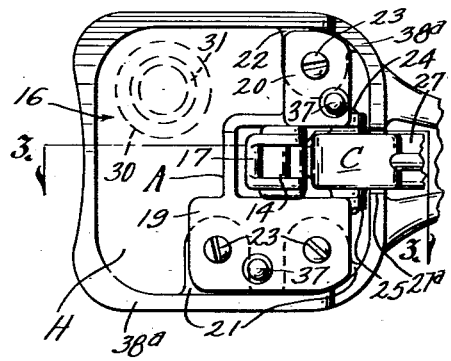
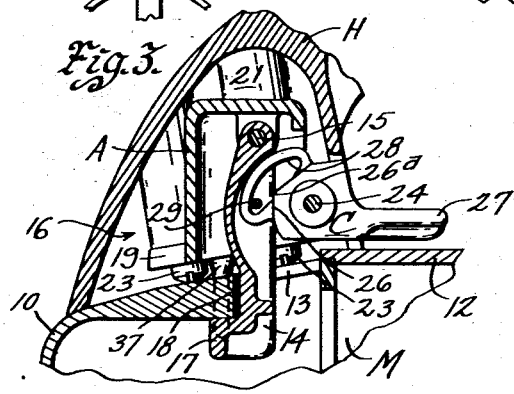
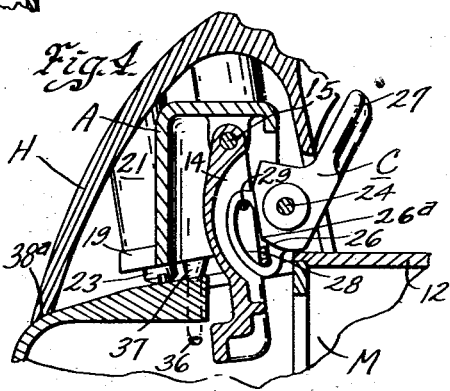
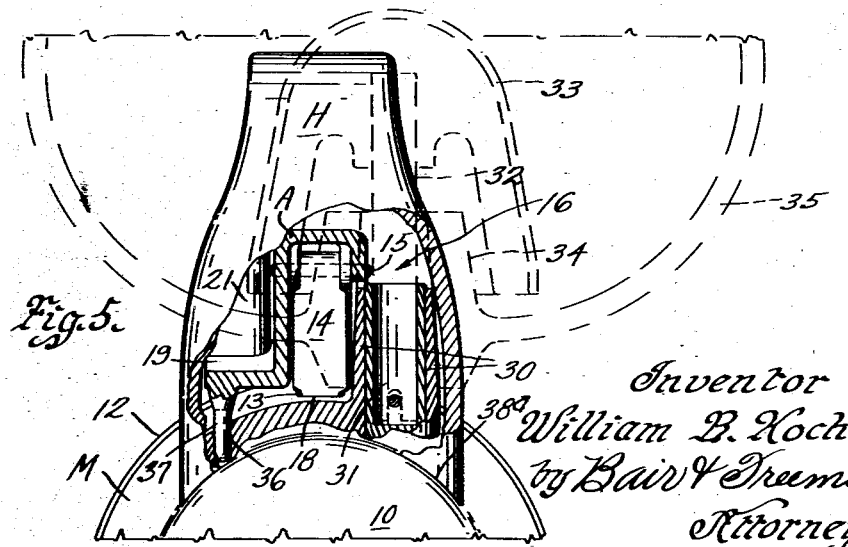
Inventor
William B. Kochner
by Baird & Freeman
Attorneys Patented Nov. 14, 1939

2,179,745

UNITED STATES PATENT OFFICE 2,179,745

FOOD MIXER HANDLE CONSTRUCTION

William B. Kochner, St. Louis, Mo., assignor to Knapp-Monarch Company, St. Louis, Mo., a corporation of Missouri Application December 14, 1937, Serial No. 179,723

5 Claims. (Cl. 146—3)

An object of my invention is to provide a handle structure especially adapted for food mixer motors and the like of the type having fruit juicer mechanism associable therewith, the handle being removable relative to the motor and having a cavity therein for receiving the juicer operating mechanism and concealing it when the handle is mounted on the motor.

A further object is to provide a handle for a food mixer and fruit juicer motor which has a simple and inexpensive mechanism for connecting the handle to the shell of the motor, such mechanism being readily operable to facilitate connection and disconnection of the handle relative to the motor.

More particularly it is my object to provide a handle for food mixer motors which has a cavity to receive and conceal a fruit juicer operating mechanism when the handle is in position on the mixer motor, the handle having in it a swingable latch adapted to enter an opening in the motor shell and cam means being provided to engage the latch with the edge of the opening for retaining the handle in position.

Still another object is to provide latch mechanism for a handle which mechanism can be mounted in the base of the handle and be made of metal as required for strength while the handle itself may be of moulded Bakelite or other suitable composition.

With the foregoing objects in view, my invention consists of an arrangement and combination of parts of my food mixer handle construction to attain the objects contemplated and others, as hereinafter more fully set forth, pointed out in my claims, and illustrated in the accompanying drawing, in which:

Figure 1 is a side elevation of a portion of a food mixer showing my handle construction associated therewith, a portion of the mixer being broken away and other portions thereof being shown in section.

Figure 2 is a bottom plan view of the base of the handle showing the parts on an enlarged scale.

Figure 3 is a vertical sectional view as taken on the line 3—3 of Figure 2 and showing the latch in the base of the handle in latched position relative to the mixer motor.

Figure 4 is a similar sectional view showing the latch unlatched; and

Figure 5 is a front elevation partly in section on the line 5—5 of Figure 1 and showing in dash lines a fruit juicer mechanism associated with the food mixer.

On the accompanying drawing I have used the reference character M to indicate a food mixer motor and H a supporting handle therefor. The motor M has shell portions 10 and 12 with which the base of the handle H engages when the handle is mounted on the motor. The shell portion 10 is provided with an opening 13 to receive a latch 14.

The latch 14 is pivoted as at 15 to an insert A mounted in the base of the handle H. The base of the handle is hollow as indicated at 16 to receive the insert A. The latch 14 is provided with a hook 17 to hook under an edge 18 of the opening 13 as shown in Figure 3.

The insert A has a pair of flanges 19 and 20 which are secured to bosses 21 and 22 formed in the handle H. These flanges may be secured to the bosses by screws or the like 23. The handle H may be moulded of Bakelite or the like while the insert A is preferably formed of metal. The insert is somewhat box-like in character and opens downwardly so that the latch 14 can extend therefrom and out of the lower end or base of the handle H.

The latch 14 is held in the latched position in Figure 3 by a cam lever C. The lever C is oscillatable on a pivot pin 24 carried by ears 25 of the insert A. The cam C has a face 26 adapted to engage the back of the latch 14. The cam face 26 takes the thrust of the latch 14 when the handle is latched on the motor shell 10 as in Figure 3, while a corner 26a of the cam normally prevents reverse unlatching movement of the cam. When it is desirable to unlatch the latch, the cam lever C may be rotated counter-clockwise by using the fingers of the hand holding the handle H to raise a lever portion 27 of the cam lever C to the position shown in Figure 4. This causes a second cam face 28 to engage a pin 29 carried by the latch 14 and pull the latch to unlatched position after which the handle H can be removed from the mixer M.

The cavity 16 in the handle H is adapted to receive a boss 30 extending from the motor shell 10 (see Figure 5). Within the boss 30, a tubular shaft 31 is rotated by the motor and is adapted to receive a shank 32 of a fruit reamer 33 while the boss 30 is adapted to be received in a boss 34 of a juicer bowl 35. The juicer, of course, can be used only when the handle is removed. When the handle is mounted in position on the motor M it covers and conceals the boss 30 thus giving to the device a much neater appearance than where the boss when not in use, projects into view. The boss, however, does not in any way interfere with proper cooperation of the handle with the motor when it is desirable to hold the motor by hand for using the mixer element 36a projecting from a downwardly extending boss 37a of the motor M.

For the purpose of definitely locating the handle H and its cavity 16 on the motor M, I provide perforations 36 in the motor shell 10 and locating dowel pins 37 to enter the openings. The dowel pins extend downwardly from the flanges 19 and 20 of the insert A and are rounded on their lower ends to facilitate entry thereof into the openings 36 when the handle is being placed on the motor.

Thus my handle structure is particularly adapted for a food mixer of the type wherein the motor is removable from a supporting arm 38 when it is desirable to use the motor by holding it in the hand for cooperation with the contents of a pan on a stove or the like. The latch mechanism insures rigid connection of the handle to the motor, the lower face 38a of the handle being shaped to closely fit the contour of the motor shell. The handle, however, can be quickly disconnected from the motor when it is desirable to place the juicer mechanism elements 32—33—34 and 35 on the boss 30 for fruit juicing operations.

Some changes may be made in the construction and arrangement of the parts of my handle structure without departing from the real spirit and purpose of my invention. I therefore intend to cover by my claims any modified forms of structure or use of mechanical equivalents which may be reasonably included within their scope.

I claim as my invention:

1. A food mixer handle structure for use with a food mixer motor having projecting means to operate a juicer mechanism comprising a handle for supporting said motor by hand and means for detachably connecting said handle to said motor, said handle having a cavity therein to receive and conceal said first means when said handle is attached to said motor.

2. In combination with a motor having an opening in the shell thereof, a handle for supporting said motor by hand, a hook shaped latch pivoted to said handle and adapted to enter said opening, a cam lever pivoted to said handle and projecting therefrom, the base of said handle being hollow and said hook shaped latch and cam lever being mounted therein with an operating portion of the cam lever projecting through the wall of the handle, said cam lever cooperating with said hook shaped latch to cause swinging and thereby latching and unlatching thereof relative to the edge of said opening.

3. In combination with a food mixed motor having an opening in the shell thereof, a handle, a hook shaped latch pivoted to said handle and adapted to enter said opening, a cam lever pivoted to said handle and projecting therefrom, the base of said handle being hollow and said hook shaped latch and cam lever being mounted therein with an operating portion of the lever projecting through the wall of the handle, said cam lever cooperating with said hook shaped latch to cause swinging and thereby latching and unlatching thereof relative to the edge of said opening.

4. The combination with a food mixer motor having an opening in the shell thereof, a handle, a hook shaped latch pivoted to said handle and adapted to enter said opening and means for swinging said latch to hook under the edge of said opening when said handle is in position on said shell covering said opening, said means comprising a cam lever pivotally mounted and having a cam surface to swing said latch toward latched position and a second cam surface cooperable with said latch to retract the latch from latched position.

5. The combination with a motor, of a handle for supporting said motor, said handle having a hollow base, said motor having an opening in the shell thereof, a hook shaped latch pivoted to said handle and adapted to enter said opening, a pin carried by said latch, a cam for swinging said latch to hook it under the edge of said opening when said handle is in position on said shell covering said opening and with its hollow base concealing said opening, said cam being pivotally mounted and having a cam surface to swing said latch toward latched position and a second cam surface cooperable with said pin to retract the latch from latched position.

WILLIAM B. KOCHNER.